Figure 1:
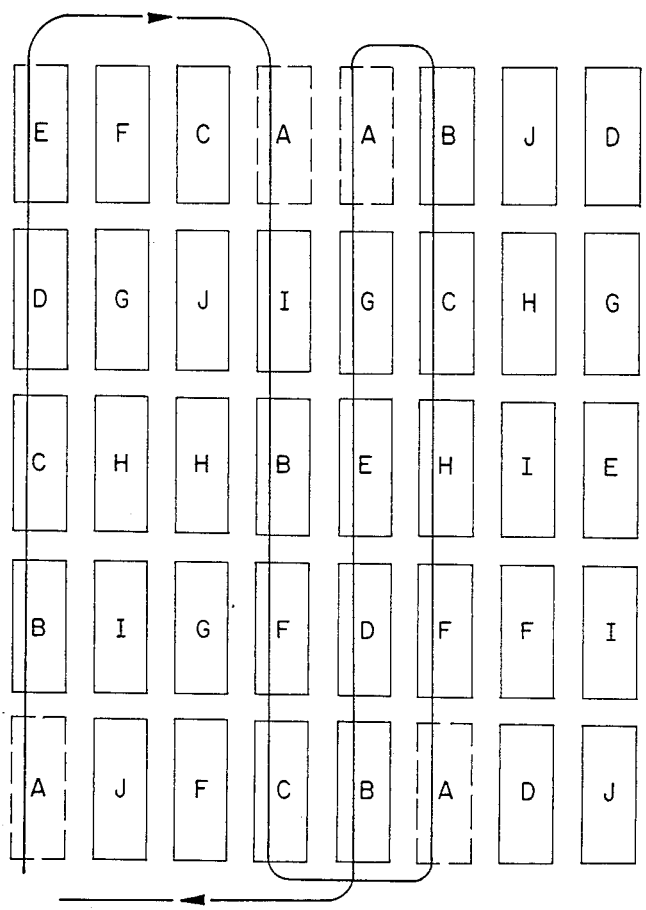
Figure 3:
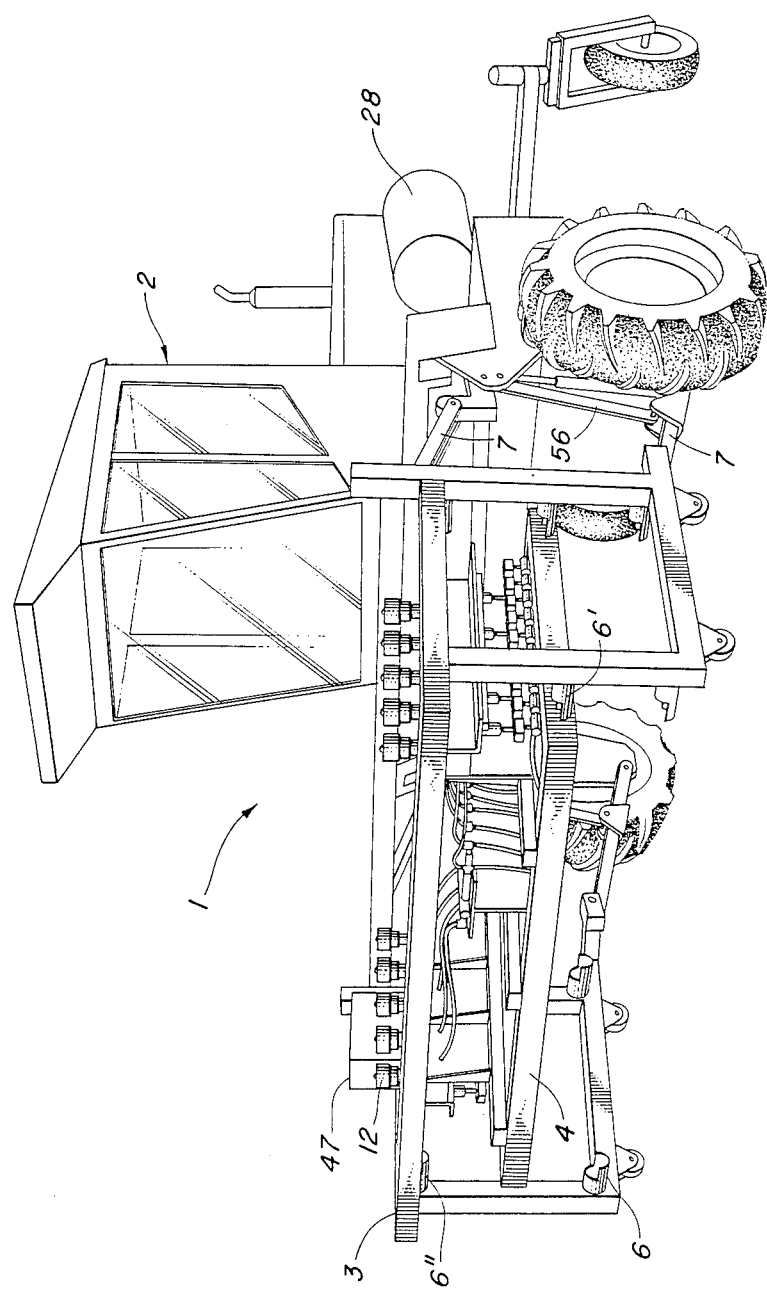
Figure 4:
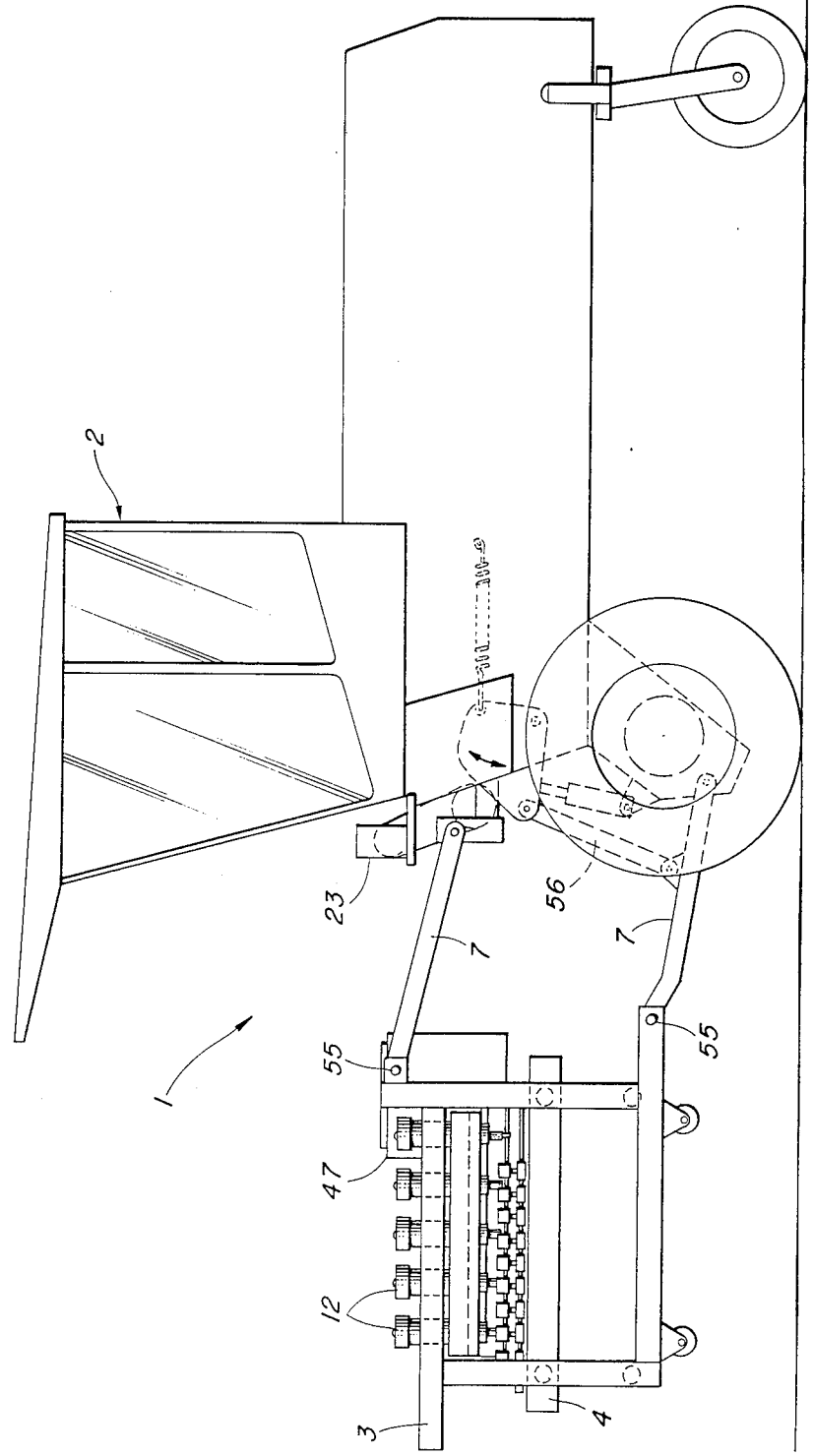

United States Patent [19]

Curran, Jr.

[11] Patent Number: 4,813,604
[45] Date of Patent: Mar. 21, 1989

[54] MULTI-BOOM FIELD SPRAYER

[75] Inventor: Thomas A. Curran, Jr., Wilmington, Del.

[73] Assignee: E. I. Du Pont de Nemours and Company, Wilmington, Del.

[21] Appl. No.: 124,868

[22] Filed: Nov. 23, 1987

Related U.S. Application Data

[62] Division of Ser. No. 875,696, Jun. 18, 1986, Pat. No. 4,723,709.

[51] Int. Cl.$^4$ .................... B05B 13/02; B05B 15/06
[52] U.S. Cl. .................................. 239/163; 239/166; 239/172; 239/176; 414/686
[58] Field of Search ............... 239/164, 159, 163, 166, 239/282, 283, 273, 176, 170, 172; 414/607, 608, 686

[56] References Cited

U.S. PATENT DOCUMENTS

| 132,407 | 10/1872 | Neer . |
| 364,790 | 6/1887 | Wickersham . |
| 386,121 | 7/1888 | Gauthier . |
| 458,232 | 8/1891 | Kephart . |
| 1,509,222 | 9/1924 | Bayne . |
| 2,424,468 | 7/1947 | Keathlay | 299/40 |
| 2,596,473 | 5/1952 | Essick | 299/30 |
| 3,219,275 | 11/1965 | Green | 239/172 |
| 3,481,540 | 12/1969 | Maytum et al. | 239/1 |
| 3,504,858 | 4/1970 | Liddiard | 239/172 |
| 3,612,356 | 10/1972 | McVey | 222/145 |
| 3,752,398 | 8/1973 | Svensson | 239/1 |
| 3,782,634 | 1/1974 | Herman | 239/156 |
| 3,784,100 | 1/1974 | Kirschmann | 239/11 |
| 3,815,830 | 6/1974 | Rowan | 239/172 |
| 3,857,513 | 12/1974 | Wiggins | 239/70 |
| 4,052,003 | 10/1977 | Steffen | 239/71 |
| 4,273,285 | 6/1981 | Scholbrock | 239/164 |
| 4,358,054 | 11/1982 | Ehrat | 239/155 |
| 4,376,512 | 3/1983 | Kistner | 239/106 |
| 4,485,840 | 12/1984 | Erwin | 137/240 |
| 4,487,367 | 12/1984 | Perry et al. | 239/112 |
| 4,553,702 | 11/1985 | Coffee et al. | 239/690 |
| 4,725,004 | 2/1988 | Baran, Jr. | 239/159 |

Primary Examiner—Andres Kashnikow
Assistant Examiner—Chris Trainor

[57] ABSTRACT

A spray boom and vessel apparatus is disclosed having one or more spray nozzles adjustably mounted along the axes of a plurality of independent spray booms. The spray booms are releasably supported upon a boom frame in horizontal, parallel relation to each other. The boom frame is releasably supported by a vessel and valve frame, which also supports a plurality of vessel and valve assemblies. Each vessel and valve assembly is in fluid-flow connection with the nozzles of one of the spray booms and a source of pressurized air. The vessel and valve frame is releasably mounted on a vehicle frame, which is pivotally attached to a vehicle.

3 Claims, 9 Drawing Sheets

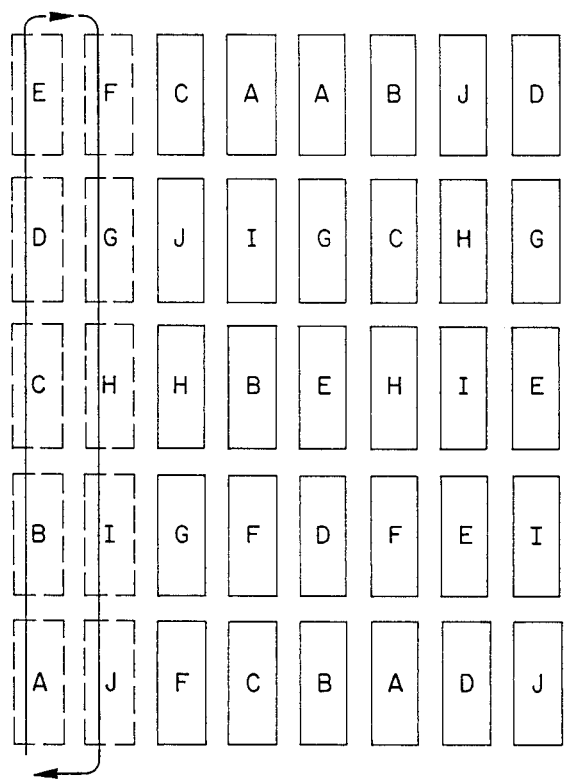
F I G. 2

MULTI-BOOM FIELD SPRAYER

RELATED APPLICATION

This application is a divisional of copending application U.S. Ser. No. 875,696, now U.S. Pat. No. 4,723,709, filed June 18, 1986.

BACKGROUND OF THE INVENTION

Numerous devices directed to the field spraying of agricultural chemicals exist in the art. Such conventional devices, however, lack inventive features responsive to the current needs of the sprayer-using market. The present invention is directed towards meeting these needs.

Field spraying devices are used in the development of agricultural chemicals as well as by the farming community. In the research process, for example, a series of screening tests are employed to determine the efficacy of compounds as crop protection or enhancement products. Once a compound is found to be active under laboratory and greenhouse conditions, tests are conducted in the field to more accurately determine the compound's potential as a commercial product and to determine optimum application conditions. The following illustrates generally employed field testing procedures.

In a typical field spray test program, a relatively small area is subdivided into test plots assuring adequately uniform conditions of crops, soil, weather, cultivation and the like. A test plot may be ten (10) feet (3.0 meters) by twenty-five (25) feet (7.6 meters) in dimension of which about five (5) feet (1.5 meters) by twenty (20) feet (6.1 meters) is the active test area. As an example, forty (40) such small plots may be combined into a 5 ×8 array or test field. This is shown in FIG. 1. Each plot within the test field requires a designated treatment. Ordinarily, due to the replications needed in statistically-designed experiments, several of the plots require the same treatment. In the past a sprayer-rigged tractor would have its spray tank loaded with the spray material prescribed for the several test plots requiring the same treatment and be driven over the test field spraying from the nozzles on the single spray boom only on the appropriate plots. The spray rig would then be returned to its base, flushed and reloaded with a new treatment. In FIG. 1, the arrowed path represents the route the tractor would follow to spray the same treatment on each of the four (4) test plots which are indicated by a dotted line. The number of such plots is typical but arbitrarily chosen for illustration only. The figure shows a field of 40 plots in which 10 treatments are to be evaluated with each treatment replicated four times.

A farmer, planting a number of different crops many requiring the application of distinct protection or enhancement products, follows a somewhat similar procedure in spray treating the crops.

This spraying procedure, necessitated by conventional devices, is time consuming, uneconomical, risks misapplication, requires excessive path length, and is overly disruptive to the soil and vegetation. The present invention which addresses these and other problems, will greatly assist the agricultural chemicals industry in its efforts to effectively handle the many experimental compounds requiring field testing each year, and the farming community in its attempt to provide us with an ever more abundant food supply.

SUMMARY OF THE INVENTION

The present invention involves a vehicle mountable field spraying apparatus adapted to spray in a sequential manner one or more of a plurality of liquids to a selected spray zone among a plurality of spray zones. As used herein, the term liquids includes, but is not limited to, solutions, suspensions, and emulsions. Contemplated for use as such liquids are herbicides, fungicides, insecticides, fertilizers, plant growth regulants and any and all combinations thereof.

Specifically, the present invention involves new and improved fluid-flow and structural systems. The fluid-flow system can be roughly divided into three functional segments: a spray system, an agitate air system and a rinse system. Each of these three segments share many of the same components and build one upon the other. Briefly, the spray system includes a source of high pressure air, a plurality of spray nozzles, a plurality of independent spray booms each carrying one or more of the spray nozzles, and a plurality of treatment vessels for containing spray liquids, the bottom of each of the vessels in fluid-flow connection with at least one of the nozzles and the top of each of the vessels in fluid-flow connection with one of a plurality of vessel valves. Each of the vessel valves in turn are in fluid-flow connection with the high pressure air source. Also provided in the spray system are a plurality of nozzle valves each in fluid-flow connection with the bottom of one of the vessels and with one of the nozzles for permitting the flow of liquid from the vessels to the nozzles only when the high pressure air flows to the top of the vessels, and means to control one or more of the vessel valves and cause high pressure air from the high pressure air source to be applied upon the liquid in one of the vessels so that the liquid in the vessel flows through the nozzle valves and the nozzles onto one of the spray zones.

In the agitate air system the vessel valves are three-way valves which in a first position connect the vessels to an open drain and in a second position connect the vessels to the high pressure air source for spraying. The agitate air system further adds to the spray system a source of low pressure air, a plurality of one-way flow valves each in fluid-flow connection with the bottom of one or more of the vessels and each in fluid-flow connection with the low pressure air source to permit low pressure air flow to the vessels only when the vessel valve is in the first position. The flow of low pressure air is prevented by the one-way flow valve when the vessel valve is in the second position connecting the high pressure air source to the vessel. Thus, in the instant system, the low pressure source agitates the liquids in the vessel with the vessel valve in the first position, but not when the vessel valve is in the second position.

Finally, the rinse system contributes to the spray and agitate air systems a rinse tank in fluid-flow connection with the low pressure air source, a rinse valve in fluid-flow connection with the bottom of the rinse tank and with the bottom of each of the treatment vessels and with each of the nozzle valves, and a plurality of drain valves with each of the drain valves in fluid-flow connection with the bottom of the treatment vessels and the nozzle valves on one of the booms and with a drain.

The structural system of the present invention involves a spray boom apparatus and a vessel apparatus.

The spray boom apparatus includes a plurality of independent spray booms each carrying one or more spray nozzles adjustably mounted along the axis of the booms, a boom frame releasably supporting the plurality of booms in horizontal parallel relation one to the other, a vessel and valve frame releasably supporting the boom frame and supporting a plurality of vessel and valve assemblies with each vessel and valve assembly having a fluid-flow connection with the nozzles of one of the booms and each vessel and valve assembly additionally in fluid-flow connection with a source of pressurized air, a vehicle frame with a support for releasably supporting the vessel and valve frame, and a means for pivotally attaching the vehicle frame to a vehicle.

The vessel apparatus contemplated includes a vessel pipe for holding spray liquid having a chamber therethrough from an open top end to an open bottom end, a vessel bottom threadingly attached to the bottom end of the vessel pipe and having an inverted conical-shaped chamber therethrough, a cap releasably connected to the top end of the vessel pipe, and a standpipe extending through the vessel bottom into and to the top of the vessel pipe for transporting spray air to and removing agitate air from the vessel pipe. Also included are a bottom tube connected to the standpipe for transporting spray air to and removing spray air from the standpipe, and a side tube connected to the lowest portion of the chamber in the vessel bottom for transporting the agitate air into and releasing the spray liquid from the vessel pipe.

BRIEF DESCRIPTION OF THE DRAWINGS

The features, operation, and advantages of the present invention will hereinafter be further described in connection with the accompanying drawings, wherein:

FIG. 1 is a plan view of a prior art test plot spray path.

FIG. 2 is a plan view of the test plot spray path when apparatus of the present invention is employed.

FIG. 3 is a perspective view of a preferred embodiment of the invention.

FIG. 4 is a side elevational view of the apparatus of FIG. 3.

FIG. 5 is a plan view of the vessel and valve frame of the apparatus of FIG. 3.

FIG. 6 is a front elevational view of the frame of FIG. 5.

FIG. 7 is a exploded view of the spraying apparatus of FIG. 3.

FIG. 8 is a sectional view of the vessel of the apparatus of FIG. 3.

FIG. 9 is a partial fluid-flow diagram of the apparatus of FIG. 3.

In each of the views, the same reference numbers designate corresponding parts.

DESCRIPTION OF THE PREFERRED EMBODIMENT

With reference to the drawings, FIG. 3 is a perspective view and FIG. 4 is a side elevational view of the spraying apparatus 1 of the invention, mounted on a farm tractor 2. Vehicle frame 3 is attached to tractor 2 by links 7 which are connected to hydraulically-actuated lift arms 56 of tractor 2. Frame 3 is a box frame missing two opposite lower edges as shown in FIG. 7. On a typical agricultural tractor, such as the Haybine (registered trademark) manufactured by Sperry-New Holland, the lift arms provide a vertical lifting range of about 17 inches (0.43 meters). However, as well known, the lifting range is determined by the length of the lift arms and the links, and by the mechanics of the particular hydraulic lift mechanism. The exact lift range is not critical, although it is important to have a fairly broad range if use over a broad range of canopy heights is desired. Throughout the lift range, the frame retains the same parallel relationship to the ground as a result of pivot attachments 55 of links 7 to vehicle frame 3. Maintaining such a relationship is important in terms of uniformity of spray liquid application.

Vessel and valve frame 4 is a rigid picture frame with four parallel pipe mounts 5 which nest in four cut-away pipe ends of mounts 6 which are fastened to vehicle frame 3. FIG. 7 shows this construction. Pipe mounts 5 and 6 are releasably fastened by quick connects (not shown) to secure vessel and valve frame 4 to vehicle frame 3. In order to permit spraying of a broader range of canopies than the range permitted by the tractor's hydraulic lift arms, vehicle frame 3 can be provided with low, 6', medium, 6, and high, 6'', sets of pipe mounts. This construction allows the assembly to carry out spraying over a broader canopy range. FIG. 4 shows such alternate positions in phantom lines. Box 47 on vehicle frame 3, shown in FIGS. 3 and 4, serves as a terminal enclosure for electrical and pneumatic connections to removable vessel and valve frame 4. Vertically adjustable pliable strips can be added to the side of vehicle frame 3 and the front and back of vessel and valve frame 4 to control wind displacement of the spray material.

FIG. 6, a front elevational view of vessel and valve frame 4 removed from vehicle frame 3, shows fastened to frame 4 a removable boom frame 8 which is a picture frame formed of angle iron, preferably made of aluminum, and which carries parallel spray booms 9 and associated nozzles 10 with nozzle valves 45, and spray boom manifold 46. The spray nozzles are attached to the booms in a manner to provide the desired spray patterns.

Mounted on vessel and valve frame 4 as shown in FIGS. 5 and 6 are two vessel manifolds 11. Each manifold forms the bottom for all vessels 12 attached to that manifold. Each vessel 12 is fabricated from a length of plastic pipe 13 topped by a quick disconnect fitting 14 having a cap 15, latches 43, and cap seal 44 as illustrated in FIG. 8. A suitable quick disconnect fitting is the KAMLOK (registered trademark) fitting device, manufactured by Dover Corp., OPW Division, located in Cincinnati, Ohio.

FIG. 8 shows a section view of vessel 12. A pressure relief valve 16, with both automatic and manual relief modes, is found in each cap. A pipe 13, forming the vessel wall, is threaded and screwed into vessel manifold 11. The manifold is prepared with an inverted conical-shaped vessel chamber 38 which terminates in a threaded bottom port 39 to accept air connection tube fitting 40 at the bottom of the manifold. Intersecting at a right angle to bottom port 39 is threaded side port 41 which accepts side tube fitting 42. Vessel standpipe 26 is part of fitting 40 which allows high pressure air to enter the vessel above the internal liquid level. It is important that vessel chamber 38 is tapered toward the bottom and that side port 41 intersects at its lowest level so all of the liquid in the vessel can be thoroughly evacuated through port 41. The standpipe design for admitting air to the top of the vessel is preferred to porting cap 15 since cap 15 is frequently handled when filling the vessel.

Figure 5:
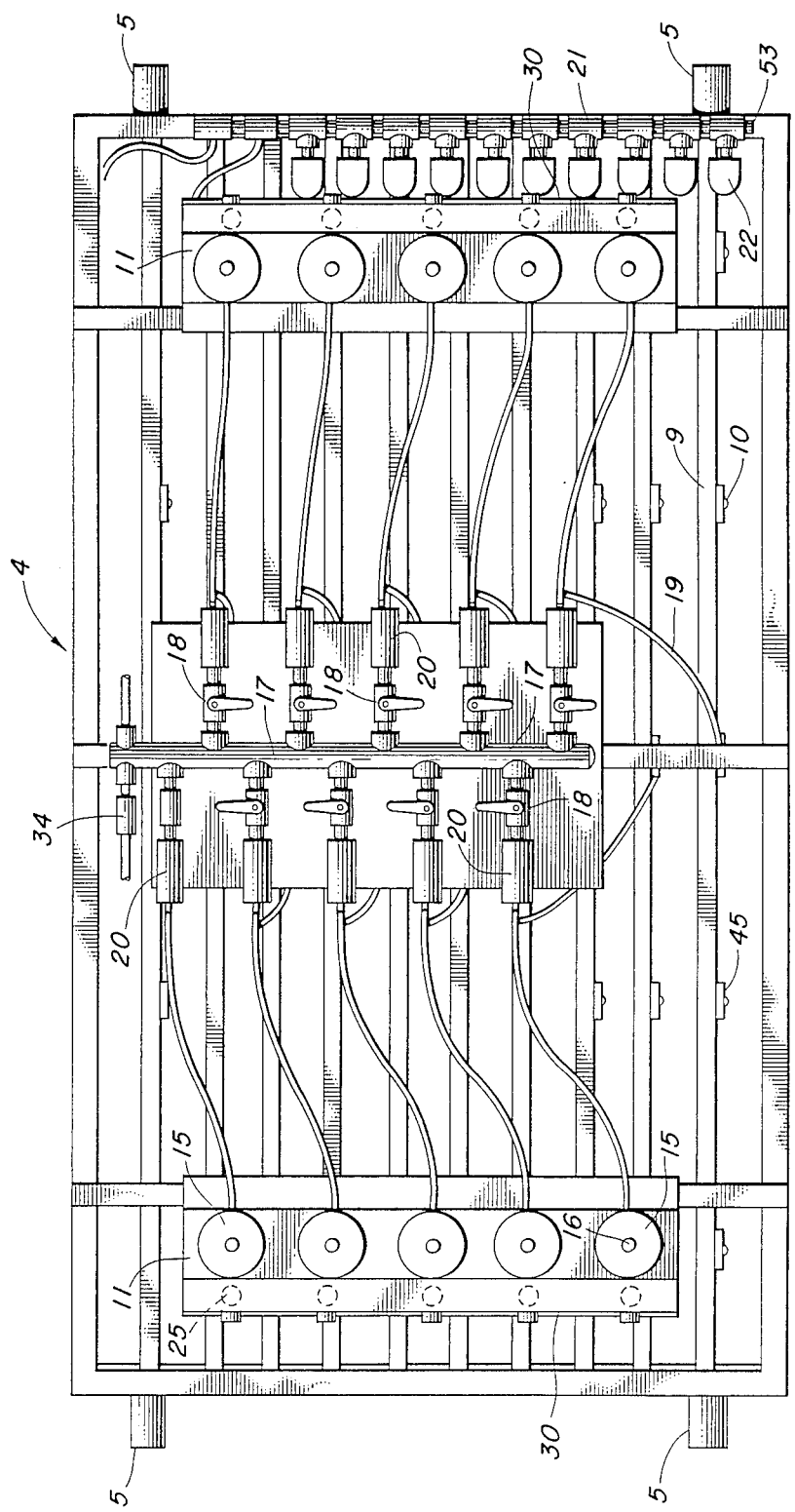
Figure 6:
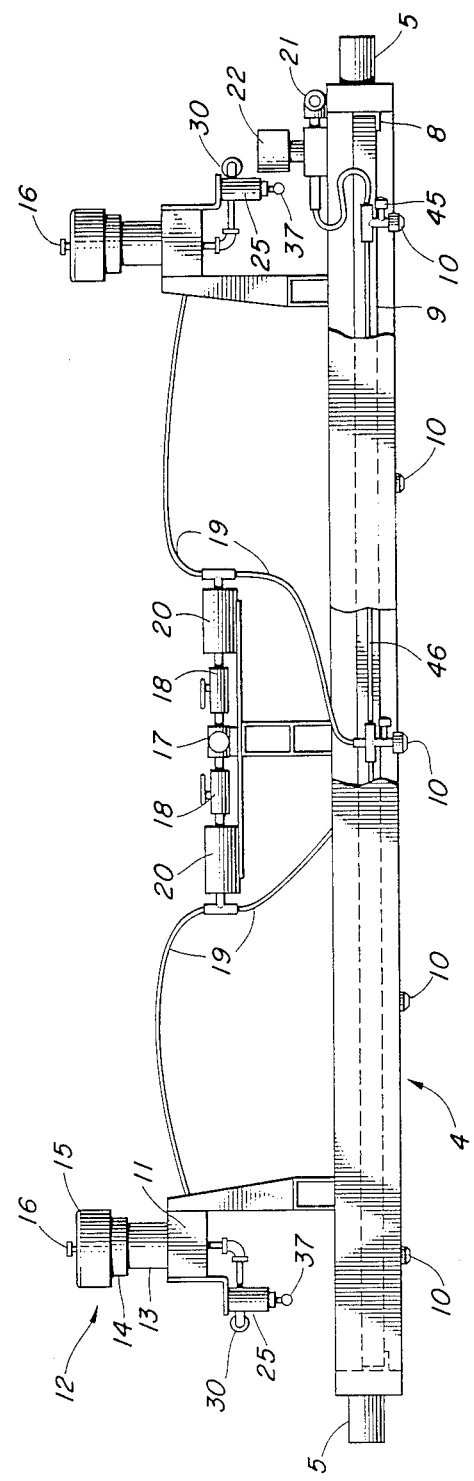
Figure 7:
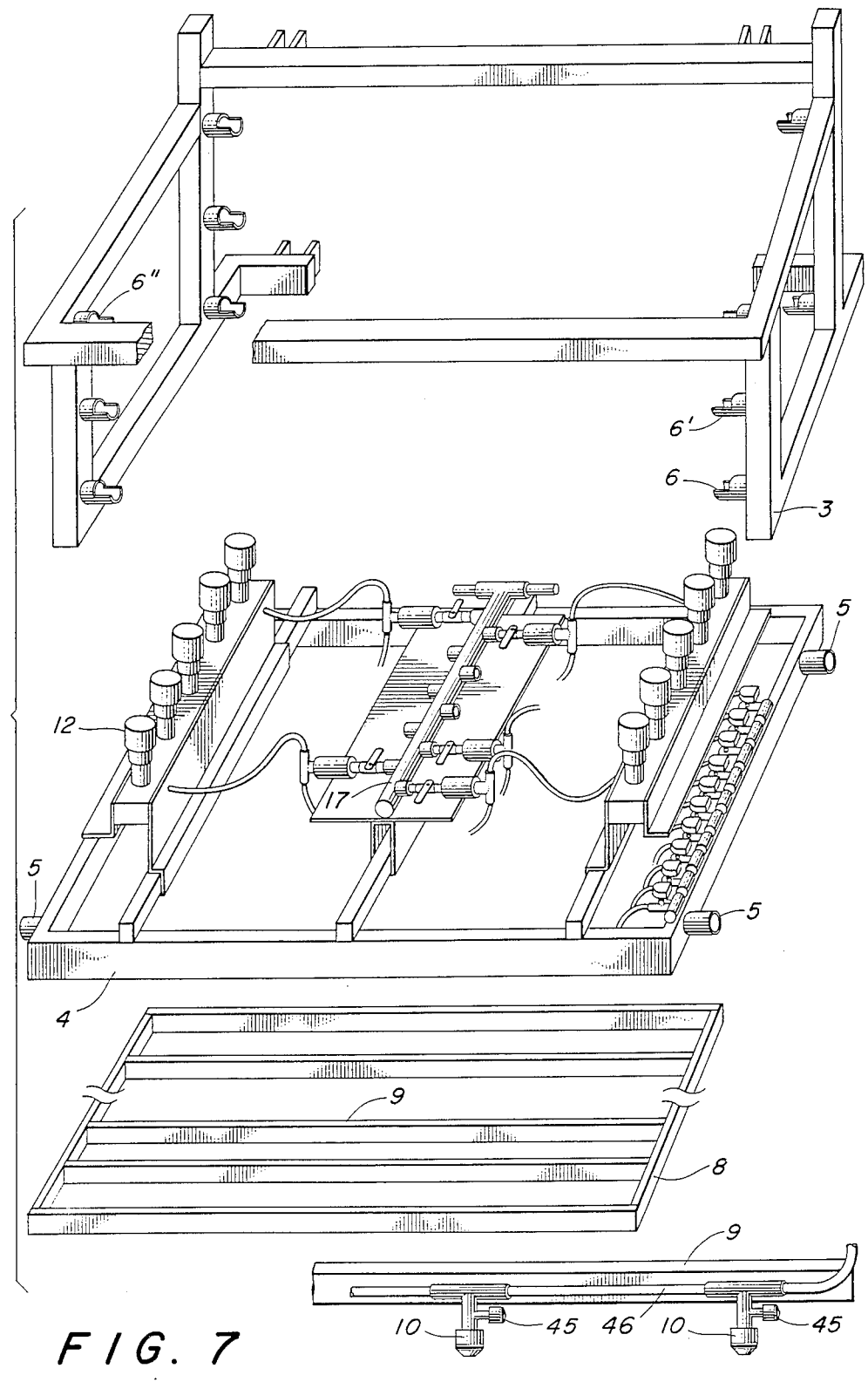
Figure 8:
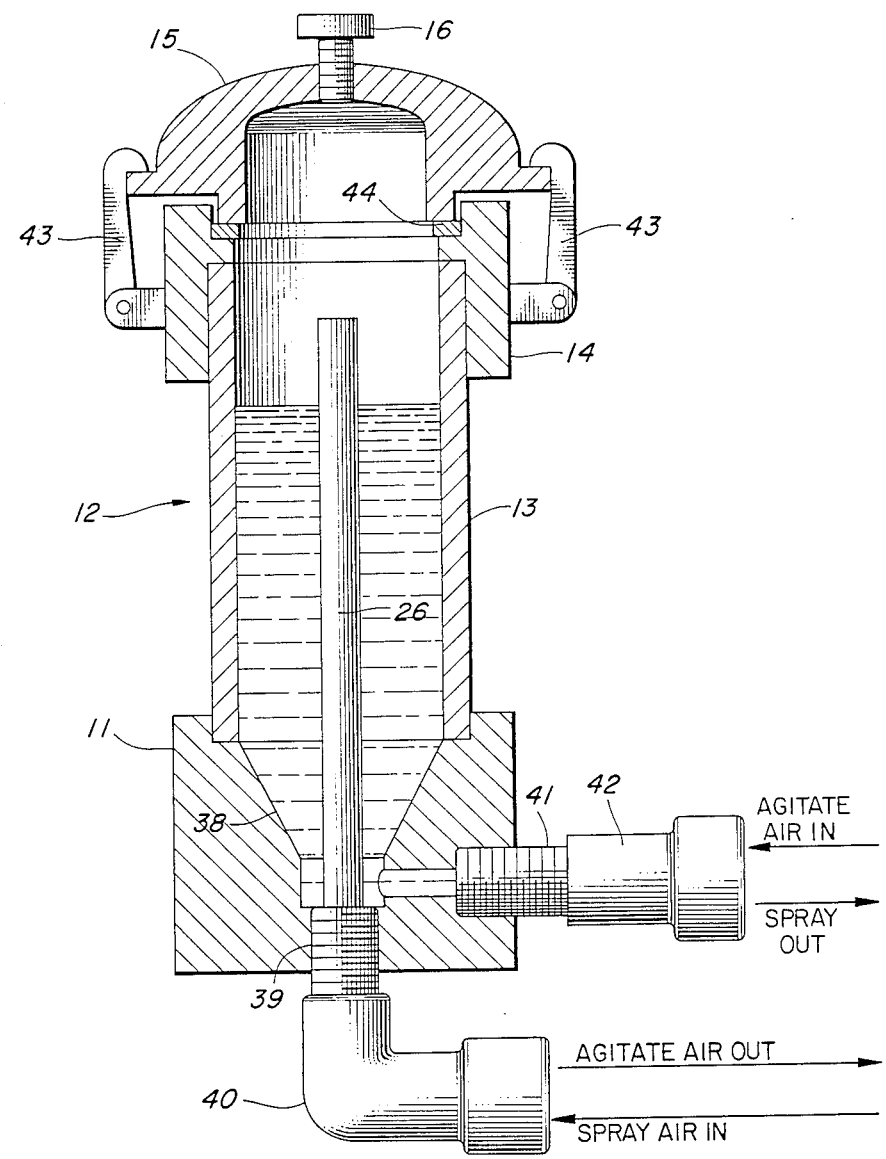

An agitate air/rinse manifold 17 shown in FIGS. 5 and 6 is centrally located on vessel and valve frame 4. This is connected via flow adjusting valves 18 to tubing 19, via flow valves 20. Individual tubing 19, 19', etc. connect vessels 12 to each of their associated spray boom manifolds 46. Each spray boom manifold 46 is connected to drain header 21 by drain valve 22.

Figure 9:
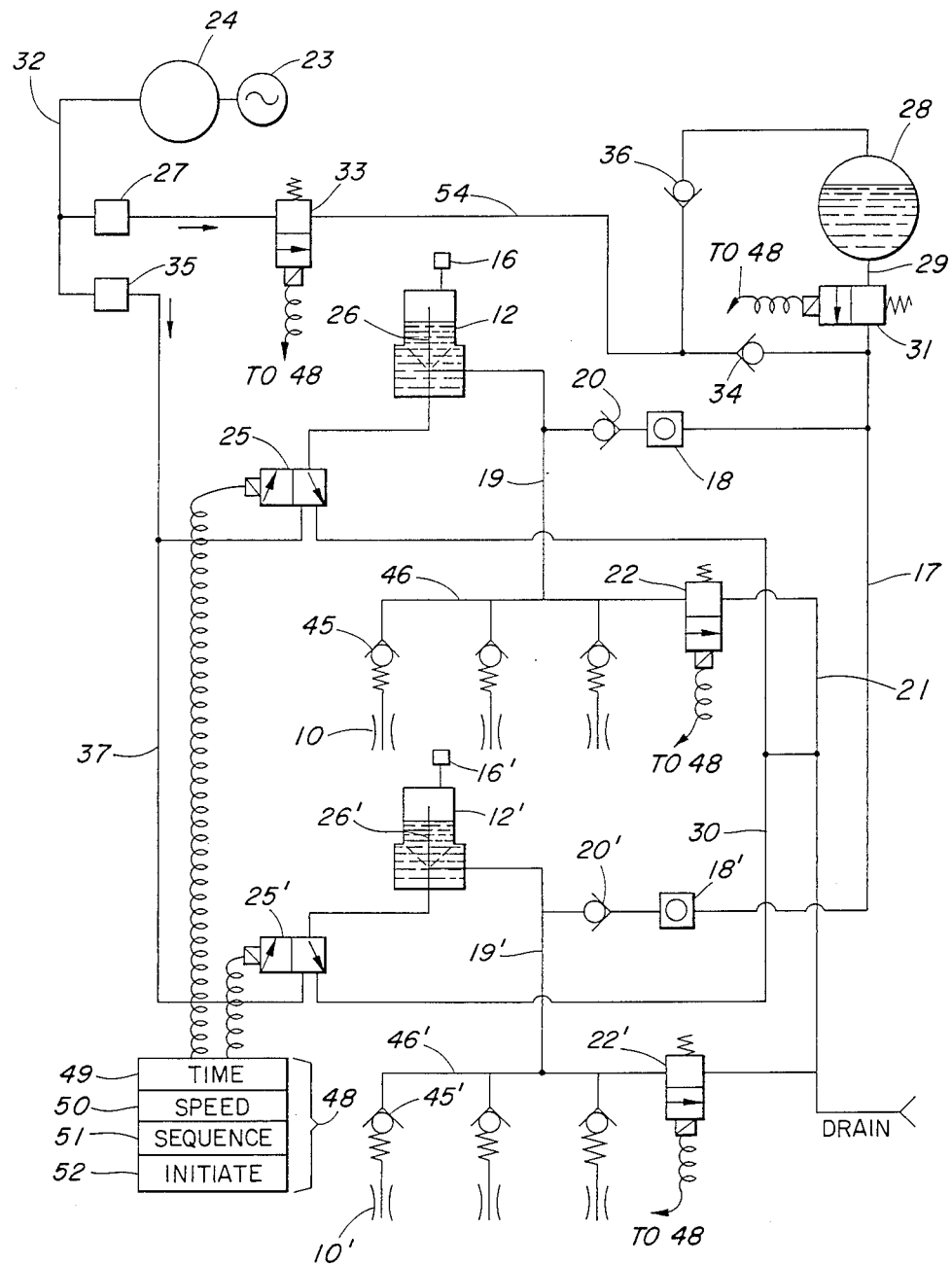

FIG. 9 is a partial fluid-flow diagram. A compressor 23 driven by the power take-off shaft (not shown) of the tractor supplies compressed air to tank 24 and main air header 32. Vessels 12, 12', etc. are connected to the air supply by vessel valves 5, 25', etc. and this air, regulated by regulator 35 to preferably about 30 psig, is introduced by standpipe 26 which extends to the top of the vessel. The phrase "top of the vessel" or "top of the vessel pipe" as used herein means above the intended internal liquid level. This provides an air over liquid delivery system which minimizes liquid chemical requirements and helps to eliminate carryover. Conventional liquid pumping systems utilized in many of the available field spraying devices fail to provide such advantages. The bottom of each vessel 12, 12', etc. is connected by tubing 19, 19', etc. to its own dedicated spray boom manifold 4, 46', etc. with associated nozzles 10, 10', etc. and nozzle valves 45, 45', etc. As used herein "bottom of the vessel" means that portion of the vessel in contact with the portion of the liquid volume having about the greatest hydrostatic pressure. Nozzle valves 45, 45', etc. are pressure-activated so that at pressures below 7 psig, the nozzle valves prevent flow to nozzles 10, 10', etc. so that the nozzles will not spray or drip. Such nozzle valves are conventional and may be obtained from Spraying Systems Co., located in Wheaton, Illinois. Agitate air is reduced from air header pressure to below 7 psig (3 psig is preferred) by regulating valve 27 and led through shutoff valve 33 and individual adjusting valves 18, 18', etc. and flow valves 20, 20', etc. to tubing 19, 19' etc. Agitate air is vented from vessel 12 through valve 25 and then through vent manifold 30 to drain header 21 which opens to the atmosphere.

Rinse tank 28 is drained by rinse line 29. For convenience in the preferred embodiment, there are two rinse tanks which merge into a tee (not shown). Rinse line 29 is connected via rinse valve 31 to agitate air/rinse manifold 17. Each spray boom manifold 46, 46', etc. is connected by drain valves 22, 22', etc. to drain header 21. The agitate air charges rinse tank 28 through one-way valve 36.

In the preferred embodiment, valves 22, 25, 31 and 33 are electrically energized valves controlled by valve sequence control 51. A programmable logic controller (PLC) 48 can accomplish this sequence control function. Manual sequence switches which allow valve sequence control without the PLC can also be utilized. In the preferred embodiment, both the PLC control and manual sequence switches are provided for valve 25. Also, in the preferred embodiment, vessel valve 25 is a three-way valve, which in a first position as shown in FIG. 9 allows the low pressure agitate air to flow through valve 25 into line 30 and drain header 21. From header 21 the air is vented into the atmosphere at drain port 53. In a second position valve 25 permits the high pressure air from air manifold 37 to flow through vessel standpipe 26 into vessel 12. Significantly, this system causes low pressure air from the low pressure air source to agitate the liquids in vessel 12 with vessel valve 25 in the first position and one-way valve 20 opened and to not agitate the liquids with valve 25 in the second position and one-way valve 20 closed. Such a system greatly reduces the number of air bubbles present in the liquid during spraying which could cause irregularities in spray application.

One way flow valves 20, 34 and 36 and pressure activated valves 45 can alternatively all be electrically energized valves. In this case they would also be controlled by valve sequence control 51. If they are electrical valves, however, care must be taken to provide sufficient electrical power on the tractor to energize them. To decrease the electrical load requirements with the preferred system, only half of the drain valves should be energized at one time during the rinse cycle.

FIG. 2 shows the path followed when employing the apparatus of the invention. The arrowed line indicates the route travelled. The treated plots are marked by a dotted line. Each plot is sprayed in sequence with a preselected liquid treatment. As treatments are required, the appropriate preloaded vessel or vessels are actuated. This spraying procedure, permitted by the instant invention, is both economical and efficient, and in addition avoids excessive disruption to soil and vegetation.

Specifically, in use, vessels 12, 12', etc. are loaded with the liquids to be evaluated. Each individual vessel is loaded with the treatment for a designated test plot. The caps 15 are locked in place. The tractor is started and air pressure is built up in tank 24 pressurizing main air header 32 to about 90 psig, and through agitate air regulator 27 to about 3 psig and spray pressure regulator 35 to preferably about 30 psig. The agitate air flows to vessels 12, 12', etc. by flowing through manifolds 54 and 17, and tubing 19, 19', etc. passing through flow valves 20, 20', etc. The air, bubbling into vessels 12, 12', etc., stirs and mixes the contents. The air vents to the atmosphere through valve 25, line 30 and drain header 21. Valves 18, 18', etc. are adjusted to achieve equal flow of agitate air to each vessel in the system. During this time, rinse valve 31 is closed to shut off access to the rinse system (described below) and valves 22, 22', etc. are closed to prevent agitate air flow through manifolds 46, 46', etc. Nozzle valves 45, 45' etc. remain closed since the agitate air pressure is below their 7 psig opening pressure. Valves 25, 25', etc. are in the first position, enabling the agitate air to vent as described but preventing the higher pressure air contained in air manifold 37 from reaching vessels 12, 12', etc. and initiating spraying.

In accordance with the spray plan, the operator selects a spray time duration on control 49. Control 49 is a timing device which on actuation will emit a control signal after a preset time elapses. In the preferred embodiment, PLC 48 controls the signal emission. The operator next enables sequence control 51. Control 51 regulates the valves in the spray apparatus and allows preselection of the spray sequence. As noted above, in the preferred embodiment sequence control 51 is part of PLC 48. In addition, manual sequence switches are supplied which alternatively allow valve sequence control without the PLC.

In operation, the tractor is driven onto the test path at the selected control speed using a speed control 50. In the preferred embodiment, a Dickey-john radar ground speed indicator is employed. The operator monitors the indicated speed and modulates the throttle speed accordingly. Fully automatic speed control using means known in the art may also be employed. On entering the first test plot, spray initiation control 52 is actuated. This can be accomplished by a foot switch (not shown) in the cab of tractor 2. Pressurized air is introduced into the appropriate vessel 12 as the foot switch input causes PLC 48 to open the appropriate valve 25 in accordance with the sequence control 51. For automatic actuation of spray initiation control 52, conventional radio frequency plot markers may be employed.

Spraying is thus initiated using the preselected vessel 12 with its preselected contents, connecting tubing 19, boom manifold 46, nozzles 10, and nozzle valves 45, all of which are dedicated to the desired treatment. The tractor is operated at controlled speed and the vessel empties out at the end of the plot. Simultaneously, or immediately thereafter, the spray time duration control 49 shuts down vessel valve 25 that applies air to vessel 12. This insures against air pressure maintaining a nozzle valve 45 open and having residue drip onto the succeeding test plot. In the preferred embodiment, PLC 48 carries out this time control function. As the tractor enters the next plot, the foot switch or the frequency markers are again employed, this time initiating the next boom in the predetermined sequence according to sequence control 51. This causes valve 25' to empty vessel 12' through nozzles 10'. The remaining plots are treated in sequence as described.

Upon completion of the spraying program, the operator proceeds to a reloading area. First it is necessary to clean the system. During spraying, rinse tank 28 is pressurized with air via valve 36 from agitate air regulator 27. When rinse is called for, valve 33 closes and one-way valve 36 closes to maintain air pressure in tank 28. Closing valve 33 prevents air entrainment in the rinse water in manifold 17. Valve 31 is opened and rinse water is admitted to agitate air/rinse manifold 17 into vessel 12, 12', etc. flowing up through lines 19, 19', etc. filling the interior of the vessels and boom manifolds 46, 46', etc. Check valve 34 prevents rinse water from entering the low pressure air line. At this point vessel valves 25, 25', etc. are in the first position. Pressurized air at approximately 30 psig then enters 12, 12', etc. by positioning valves 25, 25', etc., in the second position, forcing the rinse water through nozzle valves 45, 45', etc. to be sprayed out nozzles 10, 10', etc. After a set, short duration of rinsing through the nozzles, drain valves 22, 22' are opened. At this point pressure falls below 7 psig at nozzle valves 45, 45', etc. which close. Flushing proceeds through now opened valves 22, 22' into drain header 21 which is connected to a waste vessel on an auxiliary vehicle (not shown). The opening of valves 22, 22' is also under control of the valve sequence control 51. This rinsing procedure which involves keeping the nozzle purge to a set, short duration and utilizing a waste vessel for the remaining rinsate serves to reduce local environmental stress. An air purge follows by activating valving in a fashion similar to the spray mode—first with drain valves 22, 22', etc. shut to air purge the nozzles 10, 10', etc. and then with valves 22, 22', etc. open. A number of purges may be programmed if desired.

The system is then reloaded to prepare for the next run. If a subsequent run requires changes in nozzle type or spacing, boom frame 8 may be removed, all hoses being on quick connects, and replaced with another boom frame 8 previously prepared as desired.

Although the above description has been directed to a preferred embodiment of the present invention, it is understood that other modifications and variations known to those skilled in the art may be made without departing from the spirit and scope of the invention, as set forth in the following claims.

What is claimed is:

1. A spray boom apparatus comprising:
    a plurality of independent spray booms each carrying one or more spray nozzles adjustably mounted along the axis of said booms;
    a boom frame releasably supporting said plurality of booms in horizontal parallel relation one to the other;
    a vessel and valve frame releasably supporting said boom frame and supporting a plurality of vessel and valve assemblies with each vessel and valve assembly having a fluid-flow connection with said nozzles of one of said booms and each vessel and valve assembly additionally in fluid-flow connection with a source of pressurized air;
    a vehicle frame with a support for releasably supporting said vessel and valve frame;
    a means for pivotally attaching said vehicle frame to a vehicle.

2. The apparatus defined in claim 1 wherein said vehicle frame comprises multiple supports for releasably supporting said vessel and valve frame at multiple vertical positions.

3. The apparatus defined in claim 2 wherein said attachment means includes hydraulically-actuated lift arms.

* * * * *